United States Patent [19]
Ballard et al.

[11] Patent Number: 5,121,440
[45] Date of Patent: Jun. 9, 1992

[54] ANALOG VIDEO CHARACTER RECOGNITION SYSTEM

[75] Inventors: Claudio R. Ballard, Dix Hills; Wayne D. Tjornhom, Northport; Thomas Mazowiesky, Medford, all of N.Y.

[73] Assignee: Monolithic resources Corporation, Northport, N.Y.

[21] Appl. No.: 575,188

[22] Filed: Aug. 30, 1990

[51] Int. Cl.⁵ .............................................. G06K 9/34
[52] U.S. Cl. ................................. 382/10; 382/9; 382/11
[58] Field of Search ....................................... 382/9-13

[56] References Cited

U.S. PATENT DOCUMENTS

| | | | |
|---|---|---|---|
| H681 | 9/1989 | Weideman | 382/11 |
| Re. 32,201 | 7/1986 | Bradley | 340/747 |
| 4,461,027 | 7/1984 | Ikeda et al. | 382/9 |
| 4,481,665 | 11/1984 | Ota | 382/9 |
| 4,504,970 | 3/1985 | Werth et al. | 382/14 |
| 4,541,115 | 9/1985 | Werth | 282/14 |
| 4,545,066 | 10/1985 | Gascuel et al. | 382/11 |
| 4,635,290 | 1/1987 | Tsuji et al. | 382/9 |
| 4,654,873 | 3/1987 | Fujisawa et al. | 382/9 |
| 4,739,398 | 4/1988 | Thomas et al. | 358/84 |
| 4,742,556 | 5/1988 | Davis, Jr. et al. | 382/51 |
| 4,752,897 | 6/1988 | Zoeller et al. | 364/550 |
| 4,777,651 | 10/1988 | McCann et al. | 382/21 |
| 4,783,699 | 11/1988 | DePaul | 358/142 |
| 4,807,031 | 2/1989 | Broughton et al. | 358/142 |
| 4,811,407 | 3/1989 | Blokker, Jr. et al. | 382/1 |
| 4,811,412 | 3/1989 | Katsurada | 382/9 |
| 4,862,268 | 8/1989 | Campbell et al. | 358/141 |
| 4,903,311 | 2/1990 | Nakamura | 382/9 |
| 4,903,312 | 2/1990 | Sato | 382/9 |

Primary Examiner—Stephen Brinich
Attorney, Agent, or Firm—Brumbaugh, Graves, Donohue & Raymond

[57] ABSTRACT

A video character recognizer is provided, comprising an analog signal processor for receiving an analog video signal and for generating a position signal and a pixel signal therefrom in response to the analog video signal; a framing circuit responsive to the position signal for receiving the pixel signal and for generating an item of pixel-frame data in response to the position signal, each item of pixel-frame data being indicative of a plurality of pixel signal values; and a code conversion stored program for deriving a character code representation, such as an ASCII value, in response to the item of pixel-frame data. The recognizer derives ASCII values in real time as would be displayed on a cathode-ray-tube display in response to an analog video signal.

45 Claims, 9 Drawing Sheets

ANALOG VIDEO CHARACTER RECOGNITION SYSTEM

BACKGROUND OF THE INVENTION

The invention relates generally to the task of converting an analog video signal representing digitally generated alphanumeric character data into digital data signals and into coded values indicative of characters, and relates particularly to deriving ASCII values from a composite video signal.

In present-day computers and data processing apparatus it is commonplace to use code values to represent characters. The most commonly used code representation standard is ASCII (American Standard Code for Information Interchange), where the decimal value 65 corresponds to a capital A, 66 to a capital B, and so on. Other standards are called EBCDIC and Baudot.

While computers are readily programmed to manipulate ASCII values, and to rearrange and calculate results based on ASCII values, all such computers rely on each ASCII value having been provided somehow.

In the simple case of keyboard input, hardware generates a particular ASCII value in response to a press of a key. For example, if one presses the A key while pressing the shift key, the decimal value 65 is generated in hardware (or by a mix of hardware and software) and provided to the processor.

Another way a computer may receive an ASCII value is by reading it from a storage device such as a disk drive. There a CRC (cyclic redundancy check) capability of the hardware permits a high level of confidence regarding the ASCII value that is read.

Yet another way a computer may receive an ASCII value is through a modem. Serial data (typically eight or nine bits) are framed and latched onto a data bus and are treated as eight- or nine-bit ASCII values. A parity check often permits the recipient to have confidence in the correctness of the received characters.

Over the years the need to provide character displays for the human user of a computer system has prompted the establishment of a highly standardized so-called cathode ray tube (CRT) display. ASCII values (typically from a computer) are written into a display memory, and display hardware (or a mix of hardware and software) is dedicated to the task of generating signals that cause a raster-scan display to show characters as a function of the ASCII values. As the electron beam sweeps across the screen, the electron gun is turned on and off so as to generate light and dark areas called pixels (picture elements). The patterns of light and dark pixels form characters recognizable by the human using the same visual skills as permit recognition by the human of printed characters.

In one well known standard, the display hardware generates what is known as a composite video signal. The composite video signal contains information relating to the vertical sync (the timing signal for the electron beam to return from the lowest line of the screen to the highest line) and the horizontal sync (the timing signal for the electron beam to sweep from left to right in a given line on the screen). The composite video signal also contains analog information indicative of the desired brightness of the display at a given point, determined by the strength of the electron beam at that point.

In accordance with that standard, the CRT display receives the composite video signal and causes the electron beam to move so as to follow the horizontal and vertical position information, and causes the electron beam to have the strength provided by the brightness information. In many computer applications wherein alphanumeric text is displayed on a screen, the electron beam may have only two levels of brightness—"on" or "off".

In a typical computer generated video display signal, a computer "clock" signal is used to generate the pixels of the video signal. Characters in the display text are arranged in character spaces on the display screen which have a width corresponding to an integral number of clock pulses (for example 9 pulses). The horizontal sync signal is usually an integral number of time intervals corresponding to the character spaces, and accordingly also an integral number of clock pulses. The vertical character space for characters usually corresponds to an integral number of horizontal scan lines corresponding to the horizontal sync signal, and the vertical frame time usually also corresponds to an integral number of horizontal scan intervals.

In an environment of attempting to digitally capture the information on a digitally generated composite video signal, it is usually necessary to have a sampling clock which operates at the same clock frequency as the clock used to generate the signal. Because the pattern of video pixel dot pulses in the video signal is random (or nearly so) and varies according to the alphanumeric text, it is difficult to derive the clock signal from the video data signal.

A problem therefore arises in deriving the digital dot pattern data in digital format from a composite video signal for use in replicating that signal in another display format, for example a liquid crystal display screen, a plasma discharge display screen, a fluorescent display screen, a dot matrix printer, a laser printer, or a thermal printer.

A problem also arises if it is desired to allow a computer to make use of data generated by another data processing system, where the data processing system does not provide ASCII values but only provides an analog video signal. It is desired to do this in real time, making use of the video signal to derive ASCII values many times per second and to do so with acceptable reliability.

One attempt to solve a similar problem appears in U.S. Pat. No. 4,811,407 to Blokker, Jr. et al. Blokker shows an apparatus having a tuner for receiving broadcast television signals, and generating video and sync signals. The video signals are digitized and stored in a RAM, with addresses determined in part by the sync signals. However, Blokker would then utilize a technique of comparing the contents of a character position in RAM (a square of 16 by 16 pixels) with stored binary data representing a known character reference set. If there is a match, a code value associated with the matching reference is retrieved. Blokker apparently uses brute force, comparing quadrants of each of the 64 pixels of a character position with each of the 64 pixels of a first candidate match from the reference set, then (assuming there is no match) comparing each of the 64 pixels of the character position with each of the 64 pixels of a second candidate match from the reference set, and so on. It is not clear whether Blokker does this technique in real time for the entire screen quickly enough to keep up with the 30Hz or faster rate that screens are redrawn in broadcast television. But it seems unlikely the many thousands of comparisons required could be done in real time for successive screens full of data. Blokker seems to contemplate ignoring most of the screen full of video data, and collecting ASCII values from a single character position on the screen. Further, Blokker does not address the problem of recreating the original clock signal for capturing the video data from the screen.

U.S. Pat. No. 32,201 to Bradley shows what might appear to be another attempt to solve the above mentioned problem. Bradley teaches a way to determine the ASCII value of a character presently displayed at a particular position on a graphics screen of a personal computer. But Bradley assumes that the computer has access to the graphics video display memory of the computer, and thus assumes that unambiguous and highly reliable data are available regarding the on/off status of pixels on the display. Bradley, like Blokker above, then would make a brute-force comparison of the pixel contents and character font values in a font generation memory, and if there is a match the present position in the font generation memory is used to determine the ASCII value. The system of Bradley would be of no help in the general case where the computer that requires the ASCII values is denied access to the video display memory and the video generation clock signal, but instead only has access to the analog signal being sent to a CRT display.

Another approach is to have a human operator watch the CRT screen, recognize the characters, and type them into the computer which requires the ASCII values. This has the drawback of being labor intensive, and the greater drawback that the conversion process is error-prone and is far slower than real time.

A need exists, then, for an apparatus that permits near real-time capture of video digital dot information, recognition of screens full of displayed characters with no more information than is provided by an analog signal, derivation of ASCII values, and provision of the ASCII values for further processing and calculation.

SUMMARY OF THE INVENTION

In accordance with the invention a video character recognizer is provided, comprising an analog signal processor for receiving an analog video signal and for generating a position signal and a pixel signal therefrom in response to the analog video signal; a framing circuit responsive to the position signal for receiving the pixel signal and for generating an item of pixel-frame data in response to the position signal, each item of pixel-frame data being indicative of a plurality of pixel signal values; and a code conversion stored program for deriving a character code representation, such as an ASCII value, in response to the item of pixel-frame data. The recognizer derives ASCII values in real time as would be displayed on a cathode-ray-tube display in response to an analog video signal. The recognizer is able to derive the ASCII values in real time for all or substantially all the area of the display screen, and the values are made available to an associated device, such as a personal computer, by direct memory access (DMA) transactions on the data bus of the personal computer.

The recognizer is flexible enough to accommodate a range of display resolutions, including but not limited to 600×450 pixels, 650×488, 700×600, 840×630, 910×675, and 1024×768. Horizontal scan rates of 15 to 36 kilohertz may be processed, and vertical scan rates of 40 to 60 Hertz, either interlaced or non-interlaced. The video bandwidth may be in the range 12 to 40 megahertz.

DETAILED DESCRIPTION OF THE EMBODIMENT

Figure 1:
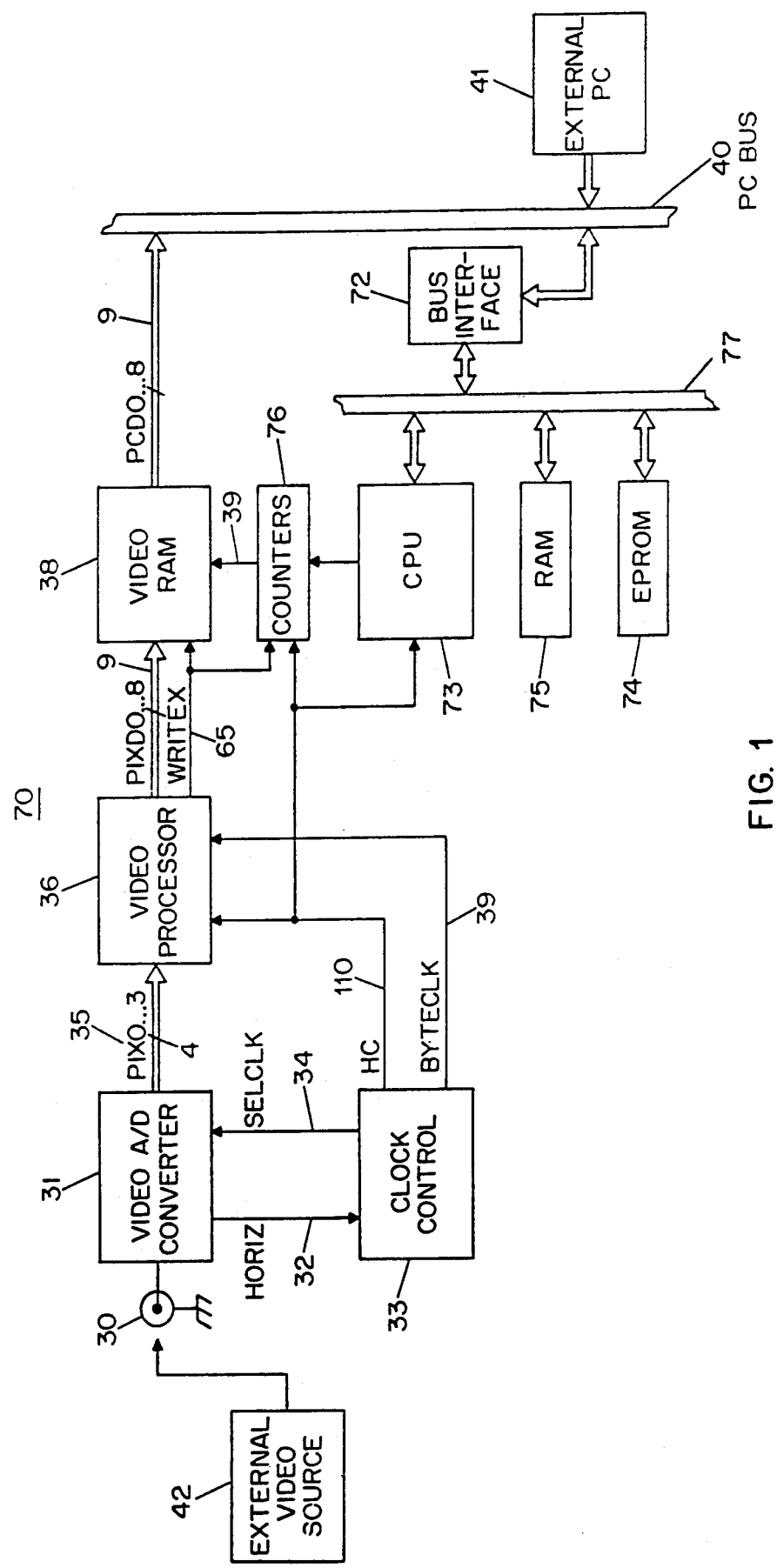
FIG. 1 shows a functional block diagram of the video character recognizer according to the invention.

In FIG. 1 is shown a video character recognizer in accordance with the invention. The analog composite video signal is provided to the recognizer at jack 30, which is preferably a coaxial connector such as a BNC connector. The analog signal is received by video A/D convertor 31, which separates out the horizontal sync signal 32 and the vertical sync signal (not shown in FIG. 1). In response to the horizontal sync signal 32 the clock control block 33 provides a clock signal SELCLK 34 to the video A/D convertor 31. As clocked by the signal SELCL which is preferably just under four times the data rate of the video data, the video data is sampled and multiplexed onto lines PIX0 through PIX3 35, representing four samples per pixel.

The lines PIX0 through PIX3 are provided to video processor 36, where they are accumulated in a selectable eight- or nine-bit shift register and latched out as controlled by signal BYTECLK 37 from clock control block 33 The latched nine-bit value is written to video RAM 38. Successive latched nine-bit values are written to successive addresses in the video RAM 38, where the starting address had been earlier provided by the CPU 73 through line 39.

The data in the video RAM 38 is made available to main memory of a personal computer PC 41 on a standard bus interface connection 40 via data path 9, which carries PC data lines PCD0 through PCD8. The PC 41 may direct commands to the CPU 73 by means of write or output commands to prearranged bus locations through bus interface block 72. The PC may also read status information from CPU 73 by means of read or input requests from prearranged bus locations through block 72.

In a typical case of character recognition, the pixel data extracted from the video input 30 is placed in locations in video RAM 38 in such a way that a character or cell matrix 9 pixels wide and 11 pixels high is stored for each character position on the display. The matrix dimensions are preferably selected to match or exceed the dimensions of the pattern created by the video source 42 as it generates the analog signal that is input at connector 30.

In a system where the matrix is 9 columns wide it is desirable to lay out the data in the video ram in two-byte chunks—eight bits go into one byte, a ninth bit goes into a second byte, and the other seven bits of that second byte are unused. This two-byte portrayal repeats for the other ten rows of the $9 \times 1$ matrix, using up a total of 22 bytes for each character matrix.

The 22 bytes of data pass through data path 9 and bus interface 40 and are made available to the personal computer PC 41. These bytes are manipulated as detailed below, and in a simple case the binary number comprised by the "1" bits in each row is determined. The binary number for the first row is multiplied by 1, the binary number for the second row by two, the binary number for the third row by four, and so on. These products are accumulated to arrive at a sixteen-bit integer. That integer is used as a pointer into a table, and the entry in the table is the ASCII value for that bit pattern.

The possibility exists that in a given character set the video bit patterns for two different characters can reduce to the same pointer integer. If this were to happen, both would point to the same location in the table, and there would be ambiguity as to which of the two characters were on screen in that location. Experience shows, however, that for commonplace displayed fonts this ambiguity does not occur.

The particular computational path leading from the full data set (the $9 \times 11$ matrix positions) to a smaller (e.g. 16-bit) integer for use as a pointer can be any of several formulas without departing from the spirit of the invention.

When the apparatus of the invention is to be applied for the first time to a particular external video source 42, it is beneficial to have a "learning" process. A human assistant connects the apparatus to a new external video source 42, reads the letters on the screen, and types the letters into the keyboard of the personal computer. The software for the learning process calculates the integer for each detected character, points to a location in the table, and places the ASCII value typed by the user into that table location. After all possible characters have been read into the table, it may be used for recognition.

In summary, the analog-to-digital-to-ASCII data flow path follows several stages:

The incoming video signal from external video source 42 must be processed to extract the pixel (also called "dot") information in relation to the other signal content, namely horizontal and vertical sync content. This takes place in video A/D convertor 31 of FIG. 1.

The dot data stream has to be sampled at times that make sense and must be quantized into "on" and "off" values for processing as binary digits (bits). This also takes place in video A/D convertor 31 of FIG. 1.

Each resulting quantized pixel binary value is placed into a local memory buffer so that upon iteratively completing the above-mentioned steps for an entire video frame of pixels (i.e. the pixels for which dot values appear between subsequent vertical sync pulses), the buffered data is passed on and processed by the next stage. This takes place in the video processor 36 of FIG. 1.

The data for an entire video frame resides i what is called a logical pixel data buffer (LPDB), and the LPDB is logically reconfigured into individual X-Y cell matrices (here called digital character recognition or DCR cell matrices) such as the $9 \times 11$ rectangles in the above example. The contents of each DCR cell are reduced via a predetermined algorithm into a single value, herein called a DCR value. The DCR value is expressed in a smaller number of bits than the number of bits in the DCR cell. For example, the $9 \times 11$ DCR cell has 99 bits of data, which are reduced to a DCR value of 16 or 32 bits. These steps all take place in the external PC 41 of FIG. 1.

The DCR value is used in a database search, and maps to an ASCII value which is returned to software. If none is found, an error value is returned. This also takes place in the external PC 41 of FIG. 1.

The ASCII or error value is placed into a buffer of translated DCR values. The content of this buffer is transferred out of the invention (e.g. to equipment external to the PC 41) by any of several standard digital methods.

ANALOG TO DIGITAL CONVERSION

To discuss further the problems inherent in the analog to digital conversion, and the inventive solution thereto, it is helpful to establish terminology. The displayed information on a raster-scanned CRT screen comes from the analog signal, and in a typical case the screen is resolved into an array 720 pixels wide and 286 pixels deep totaling 205,920 pixels. The 720 pixels are divided into 80 columns (each column comprising nine pixels) and the 286 pixels rows are divided into 26 character rows, each being 11 pixels tall. Thus there are $80 \times 26$ or 2080 character positions on the screen, each one $9 \times 11$ pixels in size.

The screen is repainted, say, fifty times per second. The vertical sync signal, which is associated with the movement of the electron beam back to the top òf the screen after painting the screen in its entirety, thus has a frequency of 50 Hz. This means the number of bits per second effectively conveyed along the analog channel is $720 \times 286 \times 50$ or about 10M bits per second.

The electron beam moves across the screen so as to complete left-to-right sweeps for all the 286 rows once each 1/50 of a second, so the start of each sweep is separated from the start of the next by a time interval of about 70 microseconds ($1/286 \times 1/50$). The horizontal sync signal, which is associated with the start of each horizontal sweep, thus has a frequency of the reciprocal of 70 microseconds, or approximately 14 kHz.

During that 70 microseconds, all the pixels of a given row (and there are 720 of them) must be communicated, so the data rate is the order of 14 kHz $\times$ 720 or about 10 MHz. The period of time associated with a particular pixel is the reciprocal, or 100 nanoseconds or less. This is consistent with the 10M bits per second mentioned above.

The above discussion is simplified and ignores the time required for the electron beam to retrace from the end of one line to the start of the next (typically 4 to 7 microseconds) and the time required for the beam to retrace from the bottom row back to the top row (typically 0.5 to 1 milliseconds). Additional time is required to allow for horizontal overscan. This presents a straight border on both left and right sides of the CRT tube, which is slightly ovoid in shape. The retrace and overscan intervals, during which no useful electron-beam intensity data may be communicated, require the data rate the rest of the time to be higher than the simplified 10 MHz to provide the effective overall data rate required. For example, a typical pixel period is somewhat less than the 100 nanoseconds mentioned above, typically 70 nanoseconds.

The phosphors on a CRT screen are selected to persist long enough to eliminate perceived flicker between sequential repaintings of the screen which, in the above example, occur every fiftieth of a second. Thus, even if some of the intensity data for a given repainting interval happened to be incorrect, the display as perceived by the human eye might nonetheless appear to be flawless. As will be discussed further below, however, a character recognition session based on a particular 1/50 of a second snapshot of the screen (that is, based on the data stream between two vertical sync signals) might suffer if any intensity data were incorrect during the sample period.

The composite signal received by the apparatus is a single-line signal relative to a signal ground. The external video source 42 indicates that a horizontal sweep is about to begin by dropping the voltage to below zero. For the duration of a given horizontal scan line (e.g. 720 dot times) the external video source 42 indicates bright and dark pixels by positive or zero voltage levels in the signal.

It might be thought that one desiring to extract pixel light/dark information could simply provide a single threshold device, such as a comparator, the output of which could be collected and stored in memory; under this approach software would look at the resulting 0 and 1 values to extract the information content of that row. However, this approach could easily miss the start of a given scan line, as illustrated in FIGS. 2 and 3.

Figure 2:
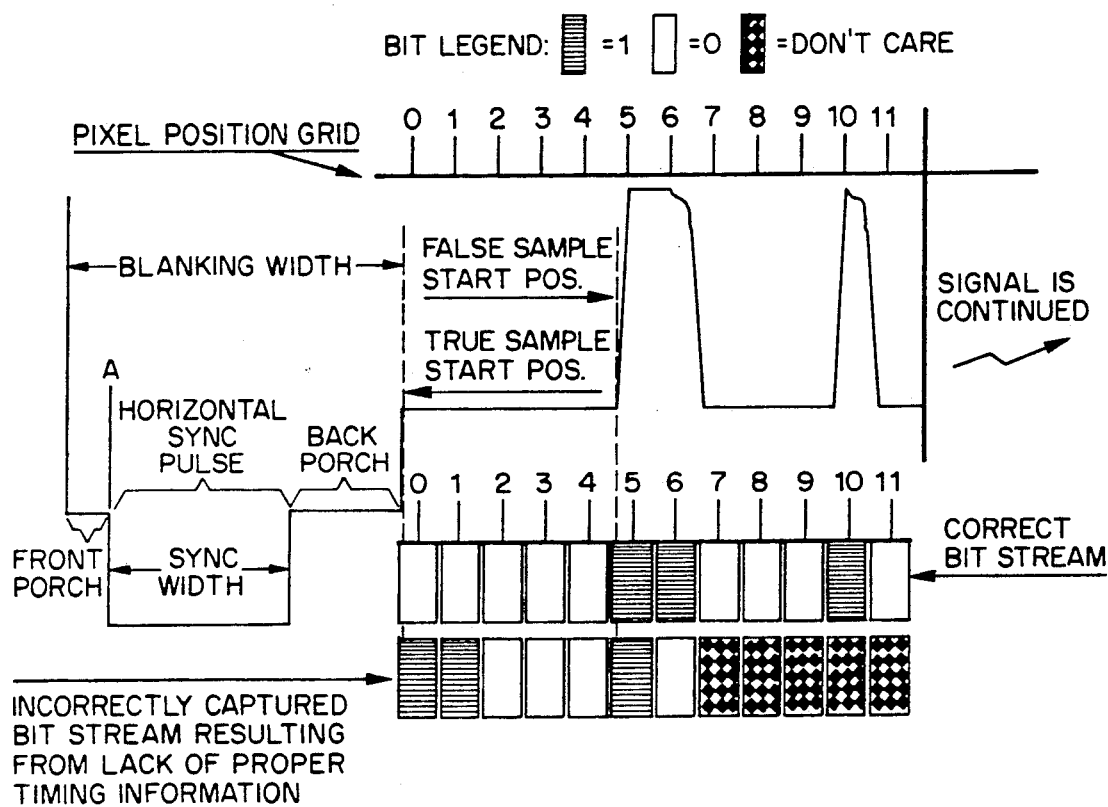
FIG. 2 depicts a portion of a video analog signal which happens to start with an "off" pixel.
Figure 3:
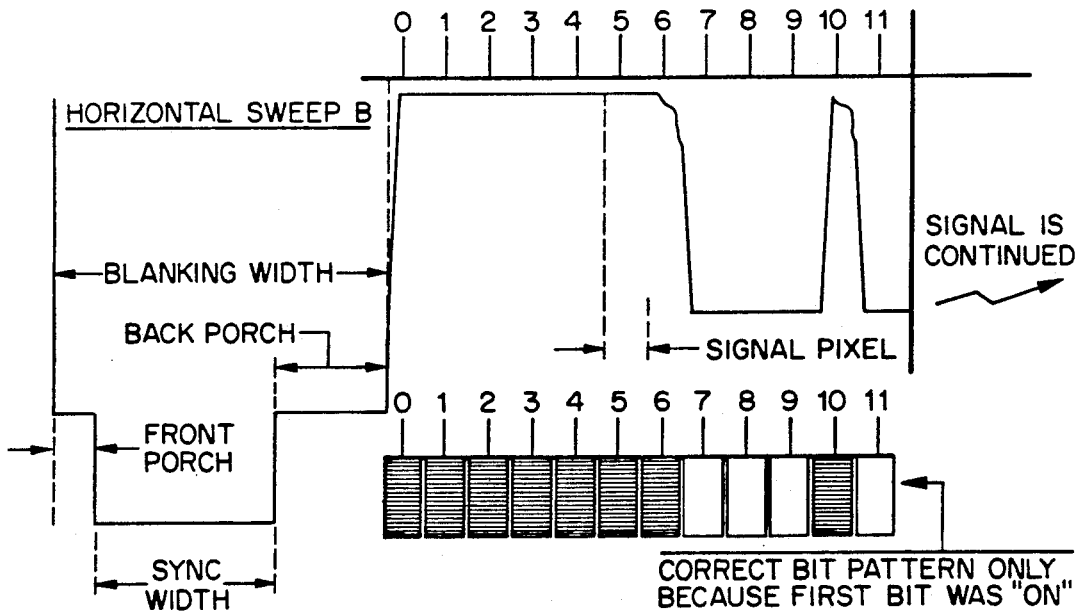
FIG. 3 depicts a portion of a video analog signal which happens to start with an "on" pixel.

In FIG. 2 is shown an arbitrary analog signal. At time A the signal drops, indicating the start of the horizontal sync pulse. (Prior to that was an interval sometimes called the "front porch".) After the sync width period has passed, the signal again rises to zero, and remains there for an interval sometimes called the "back porch". Those three intervals taken together comprise the "blanking" interval. For the next 720 (typically) dot times the signal conveys the electron beam intensity. In the simple case the intensity is bimodal—either on or off. In FIG. 2 the arbitrary data happen to be "0" for the first five dot times (dots numbered 0 through 4). It rises to a maximum voltage for the next two dot times, and so on as shown.

The figure shows one way a designer could go astray in processing the analog signal. If the circuitry merely translated the signal into two values, 0 and 1, the threshold would presumably be at a value between zero and the maximum voltage. Events in the resulting logical (binary) bit stream are determinable only in relation to other events in the same bit stream, and the only event detectable by software is a 0-to-1 or 1-to-0 transition. In particular, there would be no way for software to be apprised of the end of the "baok porch" and thus the beginning of meaningful pixel data. In the figure, this happens if the rising edge between the bit times labeled 4 and 5 were used to trigger the process of counting pixels. The "1" value for the the bit time numbered 5 would then get stored in the memory location associated with the bit time numbered 0, and so on. The consequence is that the logical (binary) bit stream is left-shifted 5 bits and backfilled with five erroneous bits.

The time interval associated with the first pixel in a row is sometimes called a "first possible pixel capture window" (FPPCW).

This problem (knowing just when the FPPCW occurs) does not arise in a CRT screen, because everything remains analog all the way to the electron gun, and the gun makes its horizontal sweep based on a horizontal oscillator internal to the CRT display monitor. The horizontal oscillator is typically a sawtooth wave, the start of which is triggered by the rising edge of the horizontal sweep signal. The first "1" pixel in the arbitrary signal of FIG. 2 displays in the correct physical location on the screen just as do its preceding neighbor pixels that happen to contain "0" values.

The received but incorrect bit stream appears at the bottom of the figure. Just above it is the bit stream that would result if the sampling were to start at the correct moment.

FIG. 3 illustrates another arbitrary bit stream, this one having a "1" value in the first pixel. In this case because the first bit happens to be a "1" the bit stream for the entire row is received correctly.

Figure 4:
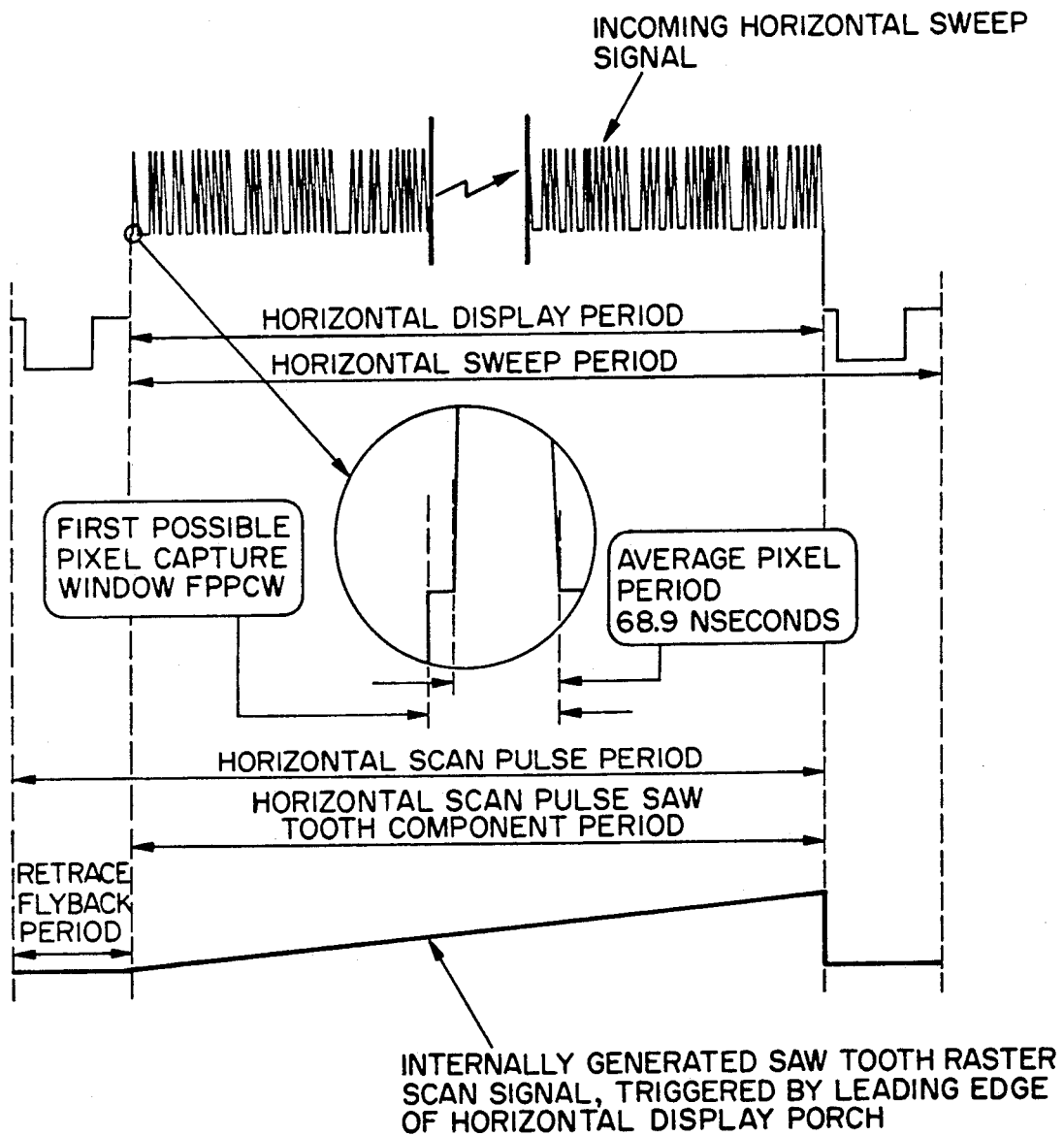
FIG. 4 shows a portion of a video analog signal for an entire horizontal scan period.

The FPPCW problem is shown in a time line (not drawn to scale) of FIG. 4. Across the bottom is the horizontal oscillator sawtooth waveform, which causes the electron beam to move evenly across a given dot row on the screen. The sawtooth rise times are separated by retrace flyback periods during which the electron gun is dark. The horizontal scan pulse period is the abovementioned typical 70 microseconds mentioned above. The sawtooth component period is a little shorter in duration. Across the top is an arbitrary video voltage level over the course of one horizontal movement of the election beam. The aforementioned negative-going waveform is at the upper left, followed by a horizontal display period corresponding to the sawtooth component period. During the horizontal display period the analog signal rapidly changes between zero and a positive level, determining the brightness of the electron beam. Not all 720 pixels are shown; the signal portrayal is broken in the middle.

Blown up in the center of the figure is the signal level at the time when pixel sampling must begin, namely the FPPCW. The required precision is shown by the fact that the pixel data value only lasts some 68.9 nanoseconds and has undesirable characteristics due to rise and fall time at the beginning and end of that interval.

Solving the FPPCW problem would be much easier if certain assumptions could be made. For example, if one could only assume the availability of a three-wire signal (ground, data, and dot clock) then the clock could be used to determine when to sample the data line. There would never be a problem of inadvertently permitting valid data to stream by without sampling it (as in the case of FIG. 2) nor inadvertently sampling at times when there is no meaningful data. But by the conditions assumed, the only information is that which may be extracted from the two-wire analog video signal. Thus the dot clock, or a proxy therefor, must be reconstructed or synthesized. This is described on a hardware level below.

In addition to the FPPCW problem, there is the problem of deciding how often to sample the voltage level. Theory suggests it should be at least the Nyquist limit, which is twice the event frequency. Here the dot clock is typically 14 MHz, so the sampling rate would, according to theory, be 28 MHz. Nothing is ever quite an exact multiple of anything else, of course, so even the 28 MHz would result in a loss of sampled events being analyzed due to a cumulative sampling error that results as the data of a given horizontal line is being sampled.

One could sample at a rate that is many, many times higher than 28 MHz and be sure not to miss any data, but normal integrated circuit technology bandwidth cannot keep up.

Figure 5:
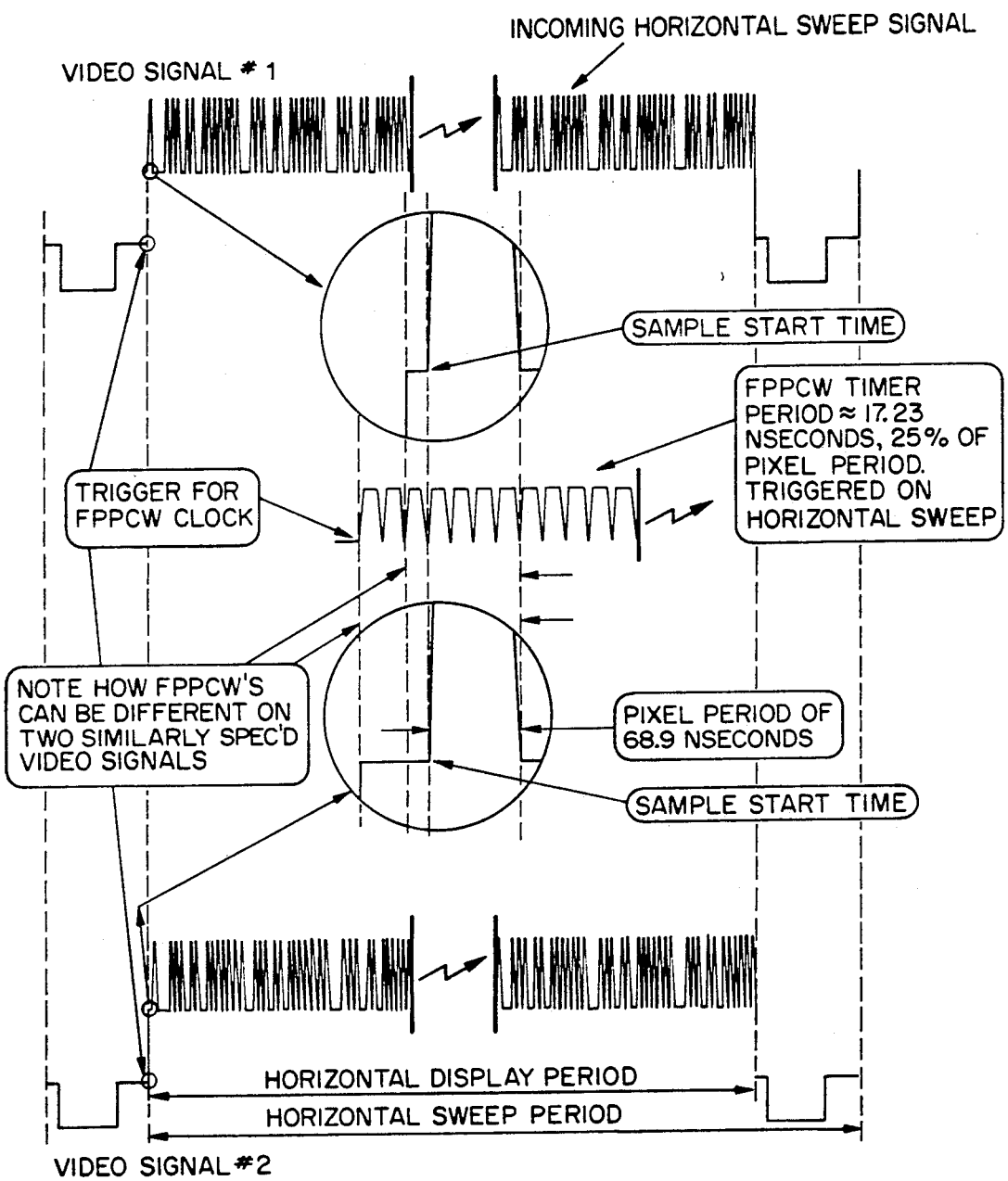
FIG. 5 shows sampling of video signals where a problem arises due to the use of differing video sources 42.

FIG. 5 exemplifies the problem that arises when one wishes to be able to recognize characters from any of a number of different video sources 42. The problem is that the horizontal sync pulse is not in a predictable relationship with the dot clock in the external video source 42. Across the top is a particular arbitrary video signal level during one row time generated by a video source 42. Across the bottom is another from a different source 42. The phase clock (here called the FPPCW clock) runs four times faster than the dot clock in the source 42; stated another way the FPPCW timer period is one-fourth that of the pixel period. Assuming the FPPCW clock has been triggered by the end of the so-called "back porch" (see FIG. 2), we see at the top that ideally only one FPPCW pulse should come and go before the sampling starts. But at the bottom a full three FPPCW pulses should optimally be allowed to pass before sampling begins. The result, if the same invention hardware is used with each of the sources 42, is that some video pixels are either lost or artificially created. This problem is easily corrected with a simple one-time adjustment for a given external video source 42.

While the adjustment could be performed in analog circuitry of the D-to-A convertor, it is preferably performed in the digital portion. A very high speed digital counter is gated by the phase clock signal. The counter is triggered by the leading edge of the porch (see FIG. 5) then via firmware control a number of ticks are counted off (determined in the adjustment process) until the data to be sampled is within the FPPCW window. Once this synchronization is attained, all subsequent samplings will be properly synchronized, even though the phase clock is not synchronized to the dot clock of the video source 42. Since no analog circuitry is involved, even minor component value changes due to minor temperature changes are unlikely to throw off the synchronization.

With the above synchronization adjustment, it might seem that one could employ a phase clock rate precisely equal to that of the external source 42 dot clock. If this could be done, much less raw data would have to be captured per unit time, and hardware downstream in the data path would not have to be of such high bandwidth. Experience has shown, however, that a phase clock four times the event rate (four times the dot clock in the video source 42) makes the process far less susceptible to anomalies between the phase clock and the source 42 dot clock, and far less susceptible to problems with temperature-related component value drifting.

Assuming that satisfactory phase clock rates have been selected and the sampling can be started at the right time, the next analog problem is quantizing the signal to 0 and 1 values for binary digital processing. Experience shows that a simple threshold level comparator suffices.

Based on the above assumption that the phase clock is four times faster than the underlying data rate, then four binary digits (called "raw capture bits") are obtained for each pixel time. Each set of raw capture bits is processed into a single bit indicative of the pixel having been on or off, and the bit is stored into a temporary frame pixel buffer. For a 9×11 character area, this means that the bit together with 98 other bits will carry all the information about the displayed character. For a 720×286 screen, this bit along with 205919 other bits represents all the information about the entire screen.

It will be noted by those skilled in the art that in many character recognition applications, such as recognition of characters on a physical document that has been scanned by a physical scanner, some of the problems that arise are quite different than problems that arise here. In the case of a physically scanned document angular skewing virtually always occurs to some non-zero extent, and must be accounted for. Skewing and other anomalies having to do with the two dimensions of the source 42 give rise to related aliasing problems.

Here, where the signal is a video signal intended to go to a raster-scanned CRT, one dimension (the vertical positioning of a pixel within one row or another) is quite trustworthy. It does not, generally speaking, occur that an "on" or "off" pixel value spuriously appears in a memory location above or below its appropriate position. As mentioned above, the pixel's temporal location in the bit stream (which is analogous to horizontal position in the display) is, however, a factor requiring close attention.

DIGITAL CHARACTER RECOGNITION

Once an entire frame of horizontal sweep signals is processed in like manner, the resulting pixel frame buffer is analyzed on a digital character recognition (herein called DCR analysis) cell matrix basis. The pixel frame buffer is accessed so as to collect bits relating to a given character position (e.g. a 9×11 rectangle). In the method according to the invention this matrix of bits is transformed into a single data element called the DCR value.

It should be appreciated by those skilled in the art that the steps of collecting pixel data for a screen full of pixels, and deriving DCR values, need not be purely sequential. For example, the calculation of DCR values would not have to await the collection of an entire screen's worth of pixel values. Instead, once the first eleven rows had been collected the DCR calculations could begin for that row.

Figure 6:
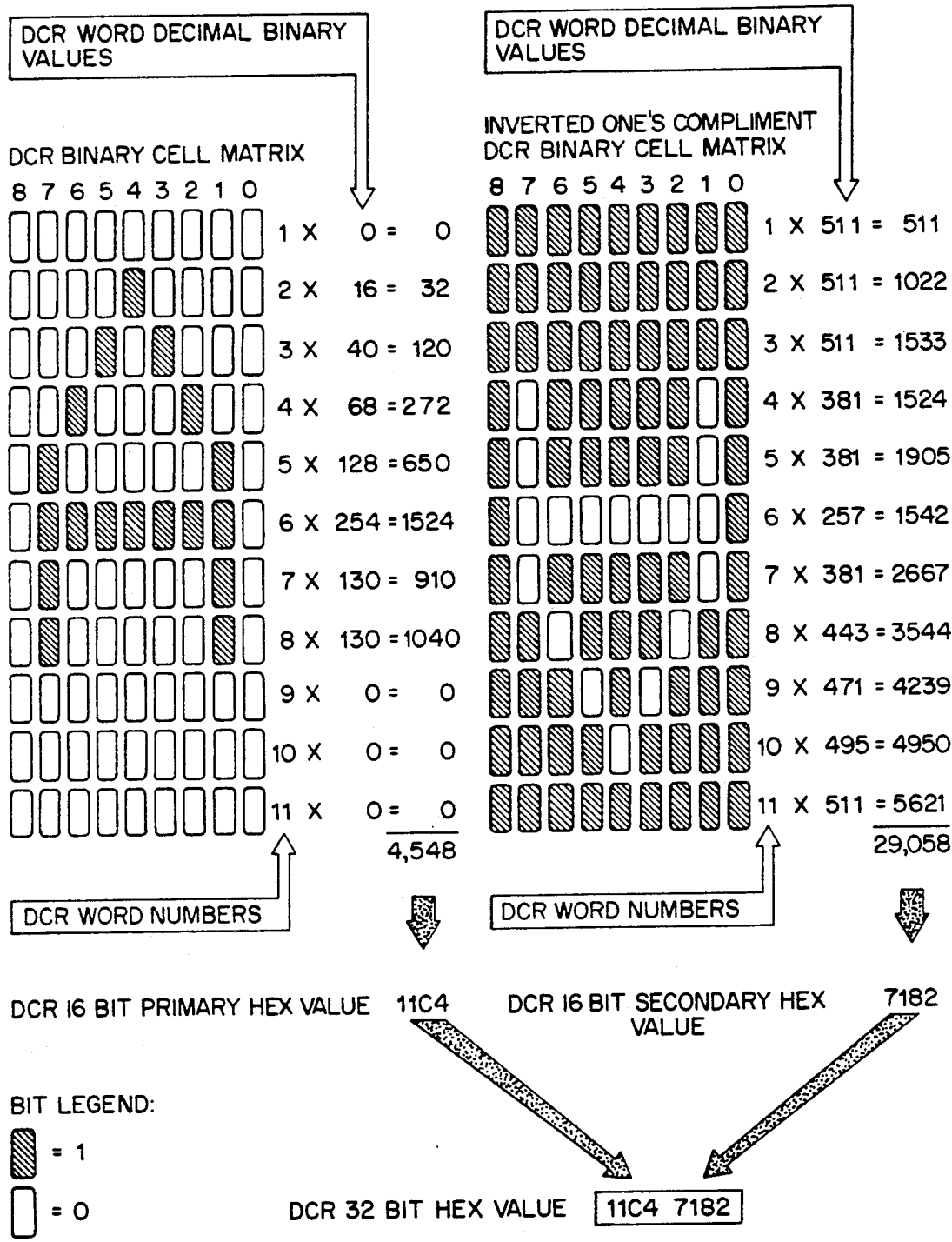
FIG. 6 shows the mapping of a 99-pixel data set to two 16-bit integers.

FIG. 6 shows in detail a DCR value derivation that has been employed in an embodiment of the invention. A typical 9×11 character rectangle is shown. The rectangle is labeled row-wise as DCR cell words 1 through 11. Each is interpreted as containing a nine-bit binary value (having decimal value between 0 and 511). Beginning with cell word 1 and ending with cell word 11, as each cell word is acquired its nine-bit numerical value is multiplied by its cell word number. The sum of the produces is accumulated as a so-called Primary Lookup Value or Primary Hex Value. Another sum of products is also arrived at, where the one's complement value is multiplied by a number that is 12 minus the cell word value; that sum is called a Secondary Lookup Value or a Secondary Hex Value. One skilled in the art will appreciate that the Primary value weighs pixels at the lower region of the character more heavily, while the Secondary value gives greater weight to the pixels at the upper region. It will also be noted that pixels at the left region of the character are given greater weight. (One skilled in the art will also appreciate that coefficients for the row word numbers could be selected as something other than the row number itself.)

The two lookup values, taken together, make up a 32-bit hex value shown at the bottom of FIG. 6.

GETTING FROM DCR VALUES TO ASCII VALUES

In accordance with the invention, once a DCR value has been derived it is used as a pointer into a lookup table, to arrive at an ASCII value. While any of a variety of table structures could be employed, one that has been found satisfactory is as follows.

Figure 7:
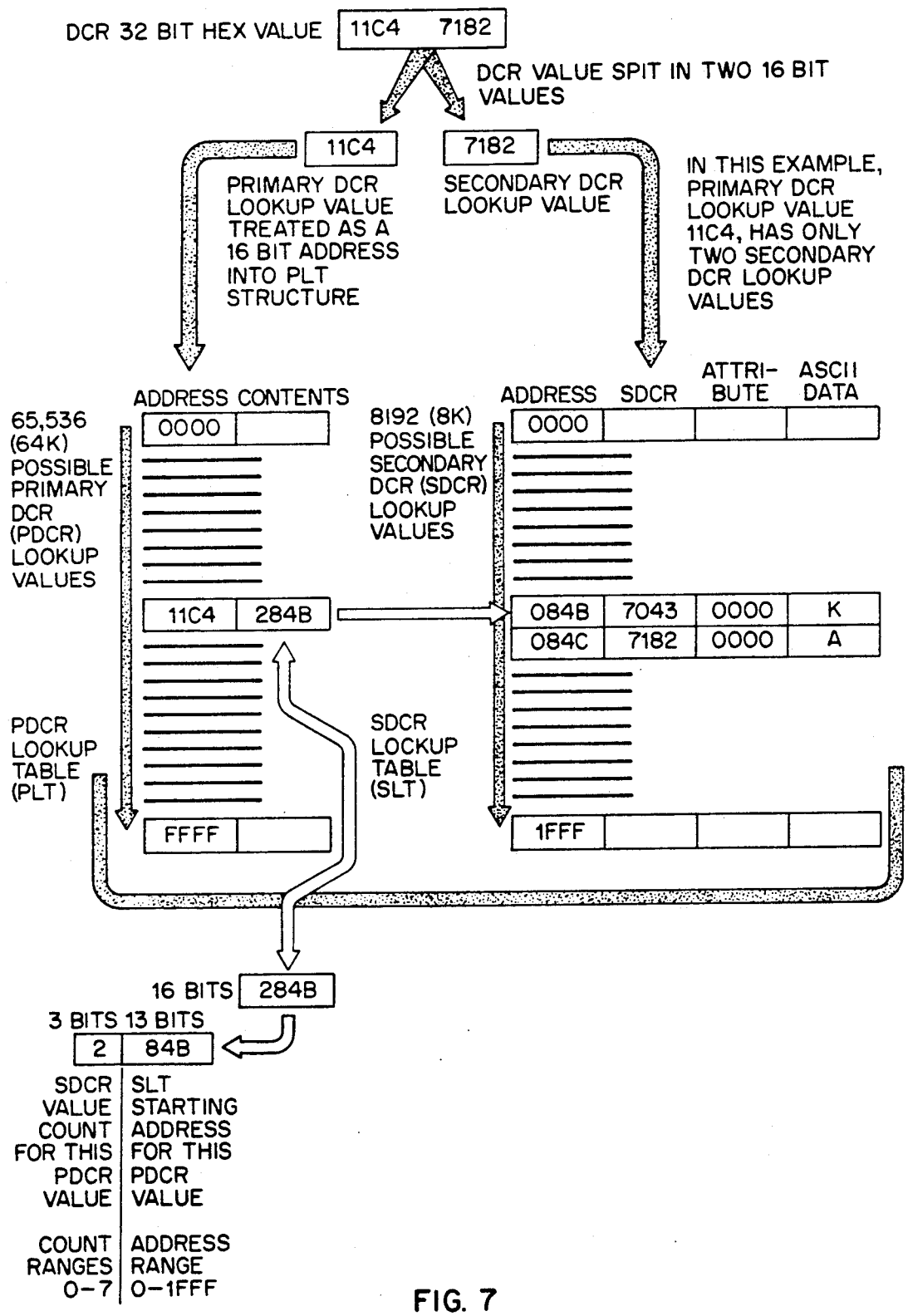
FIG. 7 shows the mapping of the two 16-bit integers to ASCII values by means of lookup tables.

As shown in FIG. 7, the Primary Lookup Value (11C4 hex in the example) is used as a pointer into a table shown at the left in the figure, called the primary lookup table (PLT). The table has 64K entries, a number determined by the fact that the lookup value has sixteen bits. Each entry is a sixteen-bit number.

The value found at the pointed-to address in the PLT table (284B hex in the example) is a sixteen-bit value, which is partitioned into a 3-bit nibble and a 13-bit part. The 13-bit part is used as a pointer into a secondary lookup table (SLT), shown at the right side of FIG. 7. That table has 8192 rows, a number determined by the fact that the lookup value has thirteen bits. The table has one column of sixteen-bit SDCR values, a second column of an eight-bit attribute value, and a third column of an eight-bit ASCII value.

The 3-bit nibble is interpreted as a number in the range 0 to 7. If the nibble evaluates to 0, the system announces an error condition, that is, that no valid character has been recognized for the subject 9×11 rectangle. This presumably happens because during the "learning" process, discussed further below, that Primary Lookup Value never arose in connection with a valid character.

Assuming the 3-bit nibble value is greater than zero, then the lookup process continues. The nibble determines the number of SDCR values of the SLT that will be checked for possible match with the Secondary Lookup Value. In FIG. 7, the 3-bit nibble evaluated to 2. This means that only two entries of the SLT table (the entries for row 084B and 084C hex) are consulted for a match. In FIG. 7, the match is found on the second try, in row 084C.

If the permitted number of attempted matches (determined by the value of the 3-bit nibble) nonetheless fails, than the system announces an error condition. Just as in the above-mentioned error condition, this presumably happens because no valid character has been recognized for the subject 9×11 rectangle; during the "learning" process, discussed further below, that Secondary Lookup Value never arose in connection with a valid character.

If there is a match (as in the case of FIG. 7) then the ASCII value is taken from the last column of the SLT table. The recognition system accommodates any of a large number of possible display attributes, such as underscored, overscored, overstrike, color, boxed character, italic, or reverse video.

The two tables, PLT and SLT, are only a few hundred K bytes in size altogether. This is preferable to what the memory requirements would be if the entire 32-bit value were used in and of itself as a pointer into a table, since that table would have to have a number of entries equal to 2 to the 32nd power.

It will be appreciated that the DCR extraction and lookup process, viewed from a mathematical perspective, simply maps a 99-bit universe into a 16-bit universe (pixel rectangle data to DCR value), then maps the 16-bit value into a 13-bit universe, and later maps the 13-bit universe into an 8-bit universe (the universe of possible ASCII values). One skilled in the art could, without deviating from the spirit of the invention, make the intermediate mapping at different levels than 16 and 13 bits. But the intermediate mapping, in the context of a real-time analog video data stream, is what makes real-time character recognition possible for the entire screenful of characters, with reasonable program and data memory sizes, and with readily available digital components.

The embodiment disclosed here assumes that the conversion to ASCII is performed by means of a general purpose microcomputer with a suitable stored program. In such a microcomputer the computations are performed by a microprocessor. Those skilled in the art will appreciate that the inventive conversion activities described here could be performed with equal facility by means of a digital signal processor, or indeed by random logic circuitry, without deviating from the scope of the invention.

"LEARNING" A CHARACTER FONT

The database of values stored in the PLT and SLT tables is generated by a process of learning, whereby the system comes to contain data regarding what ASCII value corresponds to a given pattern of pixels. In learn mode, some particular screenful of pixels, generated by a particular video source 42, is subjected to character-by-character study. The system displays the contents of one 9×11 rectangle, and the user is prompted to type the key on the keyboard for the character that is displayed. Furthermore, the user is prompted to indicate the attribute, if any, by means of a function key. For each of these display-and-type interchanges between system and user, entries are placed into the PLT and SLT. The process repeats for subsequent 9×11 regions on the screen. If a given pixel combination arises for a second time (i.e. the Primary and Secondary Lookup Values have already been entered into the SLT and PLT tables) the the system does not bother to ask the user to type it again, but simply goes to the next 9×11 region.

After some time all the possible characters will have been entered into the PLT and SLT tables, and it may be stored for future use.

One skilled in the art will appreciate that some of the PLT and SLT table information may be derived through software. For example, once a character has been "learned" as a result of on-line connection with the video source, suitable software routines may be used off-line to generate the PLT and SLT table entries for that character as it would be displayed with a reverse video attribute, simply by assuming each "on" pixel to have been off and vice versa. Similar techniques permit the off-line "learning" of a variety of permutations and attributes for characters that have already been learned on-line. (One exception is that it is not easy to learn, off-line, Italic characters from on-line recognition of Roman characters.)

MAKING USE OF THE ASCII VALUES

After the recognition process has been repeated for all the 9×11 regions on the screen, the ASCII values (of which there are 80 ×26 or 2080 in the typical case) are made available to other equipment, such as a personal computer, for further processing. The apparatus of the invention recognizes and passes along all 2080 values in real time, as often as twice per second, a throughput not previously accomplished in the prior art.

THE HARDWARE OF THE RECOGNITION SYSTEM

The hardware of the system according to the invention will now be discussed in greater detail. Turning now to FIG. 1, system 70 connects by a standard bus connector with the bus 40 of an industry standard personal computer. Bus interface 72 permits system CPU 73 to communicate, by system bus 74, with the external personal computer 41. RAM 75 and EPROM 74 provide memory for the system CPU 73, and video RAM is also accessible to the CPU 73 through the address space of the bus 74. Address decoding circuitry, not shown but well known to those skilled in the art, decodes address bits for memory and I/O transactions on the bus 74.

According to a stored program in EPROM 74, the CPU 73 watches for commands from the external PC 41 and returns data and status information to the external PC 41. Counters 76, under CPU control, determine addresses in video RAM 38 into which pixel data are loaded as described further below.

Figure 9:
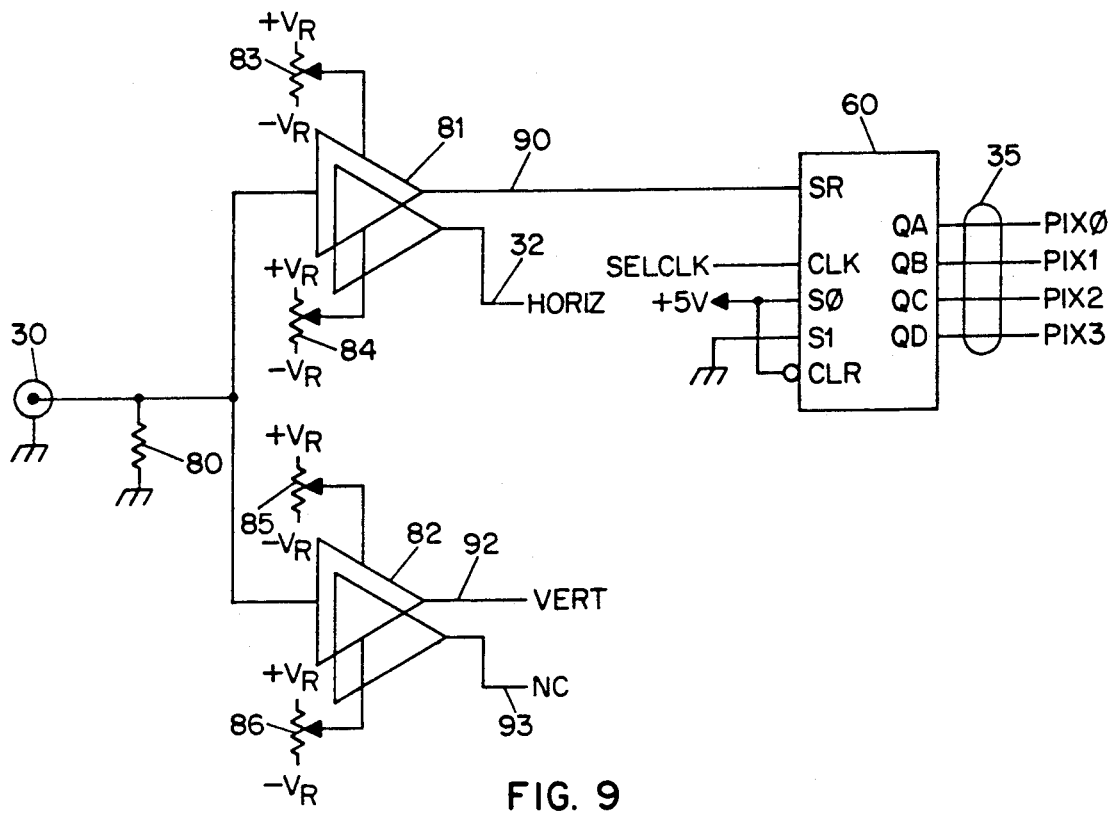
FIG. 9 shows the video A/D convertor 31 of FIG. 1 in greater detail.

Turning to FIG. 9 there is shown the circuitry corresponding to video A/D convertor block 31 of FIG. 1. The analog video signal from the external source 42 is received at connector 30, an input impedance is established by resistor 80, and the signal is provided to comparators 81, 82, which are dual-channel, high-speed comparators. The comparators have thresholds set by trimmer potentiometers 83, 84, 85, and 86. The trimmer potentiometers provide precise voltages from regulated references +Vr and −Vr.

From the comparators, output 90 is the dot information, indicative of pixels that would be displayed as "on" or "off". That output is based on a reference selected to be between zero and the highest positive voltage of the analog signal. Output 32 is the HORIZ signal, indicative of a horizontal sync pulse. The reference is set to about −0.4 V. Output 92 is the VERT signal, indicative (among other things) of a vertical sync pulse. The reference is set to about −0.25 V. The threshold levels may be set at the factory to permit the system to receive commonplace composite video signals, or may be adjusted in the field to accommodate certain nonstandard video signal levels.

Figure 10:
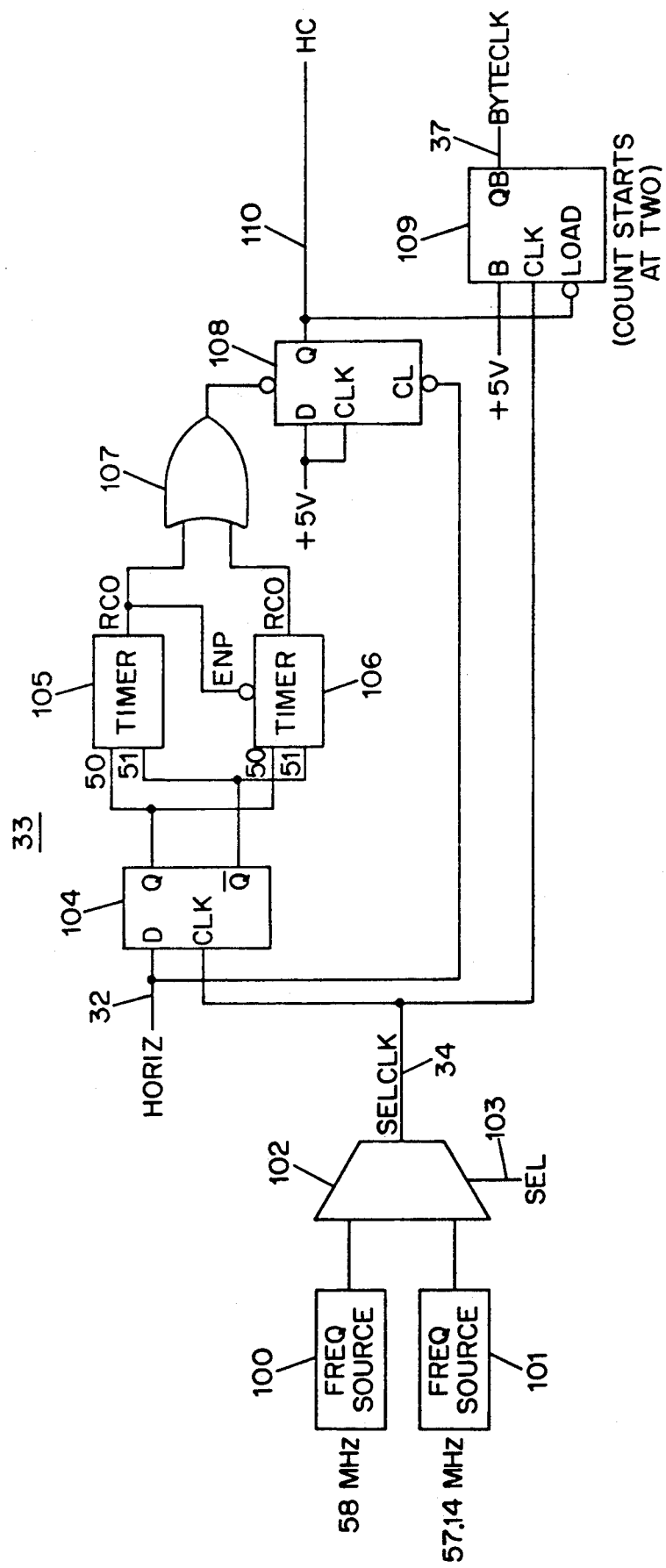
FIG. 10 shows the clock control module 33 of FIG. 1 in greater detail.

Following the HORIZ signal 32 from FIG. 9 to FIG. 10, noting that the HORIZ signal 32 gives rise to the signal HC 110, and following the signal HC 110 to FIG. 1, the screen data capture process begins with the CPU inferring the arrival of a vertical sync pulse, namely by watching signal HC 110; if it is asserted longer than 10 microseconds, it is assumed that a vertical sync pulse has arrived. (Alternatively the CPU can start its screen data capture process prompted by watching the signal VERT 92.)

Frame capture begins under CPU control. The CPU programs programmable counters 76 to determine the starting address of each horizontal line of data during an interrupt routine executed when the horizontal sync signal (HC) is detected. The initial load address is set to zero during the wait for the vertical sync pulse. Each successive horizontal line of pixel data is captured by hardware, all of which is programmed and controlled through the CPU 73.

Turning now to FIG. 10, there is shown in greater detail the clock control block 33 of FIG. 1. Preferably a plurality of frequency sources 100, 101 are provided, to accommodate dot clocks that may vary from one external video source 42 to another. Switch 102 and select line 103 determine which frequency source is used for a particular screen capture configuration.

Returning to FIG. 1, each successive horizontal line is captured using the horizontal sync signal to generate an interrupt to the CPU 73 through interrupt circuitry, not shown in FIG. 1. When the interrupt occurs, the CPU 73 loads the starting location of the next line into the counters 76, and the counters are enabled by the HC signal 110. Enabling the counters directly by HC is preferable to having the CPU trigger the counters, since the latency time of the CPU in servicing the HC interrupt comes too close to using up the entire interval between the arrival of the HC signal and the arrival, close on its heels, of valid pixel data to be stored in the video RAM 38. The counters start when enabled by HC and stop when the HC signal is no longer asserted. The pixel data provided to the video RAM 38 comes from the video processor 36, shown in FIG. 1.

This process repeats for successive horizontal lines of pixel data. When the next vertical sync pulse arrives, the CPU knows that a screenful of data has been received and informs the external PC 41 that the pixel data is available to the PC.

Returning now to the clock control module 33 shown in FIG. 1 and in more detail in FIG. 10, recall from the above discussion of the FPPCW timing requirement in connection with FIG. 5 that there is a delay between the rising edge of the horizontal sync pulse and the time when the first valid pixel data appears in the analog signal. This time is a constant (for a given external video source 42) and is generated by the video card of the external video source 42 from its master oscillator. While it would be possible to filter this blank period with software post-processing or with other dedicated hardware, because of the high data rate much RAM would needlessly be occupied with this blank data. To alleviate this, flip-flops 104 and 108, programmable counters 105 and 106, gate 107, and shift register 109 determine when the system will begin to store the do information on each horizontal line of the frame being captured. This circuitry brings about the FPPCW timing mentioned above. Counters 105 and 106 are programmed by CPU 73 through latches and data and control lines not shown in FIG. 10.

The horizontal sync signal HORIZ 32 is fed to the data pin of flip-flop 104, clocked by SELCLK 34. The outputs of the flip-flop program the counters with the setting from the abovementioned latches when the sync pulse is active. The rising edge of the sync pulse changes the outputs, and starts the counters counting down. When both counters attempt to count below zero, their carry outputs go true simultaneously, generating a pulse to flip-flop 108. The Q output of flip-flop 108 is reset to zero by the horizontal sync pulse, and remains low until the pulse generated by the carry outputs is generated. The Q output now goes to logic 1, allowing the video ram counters 76 to count by way of control lines and logic not shown in FIG. 10.

The programmed count allows the software to set the time to an accuracy of 17 nanoseconds, linked to the capture clock. This provides enough adjustment for the FPPCW timing. One skilled in the art will appreciate that an alternative way to generate the delay between HORIZ 32 and HC 110, shown in FIG. 10, would be to use a one-shot. The output pulse of the one-shot would be started by the horizontal sync pulse HORIZ 32, and timed via an RC network. This method, however, has the drawback that it is subject to drift due to temperature changes and aging.

As mentioned above in connection with the frequency sources 100, 101, the system is designed to process video data with two different dot clock rates, namely 14.318 MHz and 14.5075 MHz, producing a video image with 640 and 720 dots per horizontal line respectively. The software in the external PC 41 Which decodes the pixel data into the ASCII values uses two different formats to store and manipulate the pixel data. In the case of the 640-dot line format, each character is within a rectangle 8 pixels wide, while the 720-dot format has its characters in rectangles nine pixels wide. In the former case, each character's eight bits goes into a byte. In the latter, the nine bits of data are stored with eight bits in one byte and a single bit in the next byte; the remaining seven bits are unused. The circuitry determines which format is used by the abovementioned select line SEL 103, by way of switch 102.

ACCOMMODATING A PARTICULAR VIDEO DATA SOURCE

From the foregoing it will be appreciated that it is necessary to go through several straightforward but necessary steps for each new video data source that is to be received. The video source is connected to the apparatus of the invention, and the comparators 81, 82 of FIG. 9 are calibrated by potentiometers 83, 84, and 85 to permit consistent detection of the data, horizontal sync, and vertical sync signals respectively. (Depending on the extent to which the new video data source differs from those previously received, it may be helpful to view the voltage level at input 30 by an oscilloscope, not shown in FIG. 9.)

After the comparators are set, it is necessary to arrive at appropriate values for the programmable timers 105 and 106. A workable method is to start with a very short delay period programmed into the timers, and to increase the period by small increments until the result is consistent reliable collection of data in the first column visible to the user on the CRT screen.

SAMPLING VIDEO DATA IN HARDWARE

The video data flow path will now be discussed in greater detail, with particular reference to the video processor block 36 of FIG. 1. It is assumed that the CpU 73 was asked by the external pC 41, by way of bus 40 to sample a frame. The CPU 73 programs counters 76 with zero to start storing data in the RAM 38. The CPU 73 then enables capture of data, and enables its own interrupts. The vertical sync signal having been received, this interrupts the CPU by wa of the interrupt circuitry driven by signal HC 110, which is in turn indirectly driven by HORIZ 32.

The signal HORIZ 32 clears flip-flop 108, causing signal HC 110 to go low and setting up conditions for the programming of counters 76 and timers 105 and 106.

When signal HC was low, it programmed counter 109 to a preset value of two. This counter is used as a divide-by-4 circuit to generate a clock, called BYTECLK 37, which determines the rate at which pixel data is stored in the RAM 38.

Turning briefly to FIG. 9, the pixel data that comes in is sampled by register 60, at about four times the incoming dot frequency. Each pixel is therefore split into four parts, and these four elements are fed to video processor 36 (also called EPLD) via signals PIX0 through PIX3 35.

THE VIDEO PROCESSOR

Figure 8:
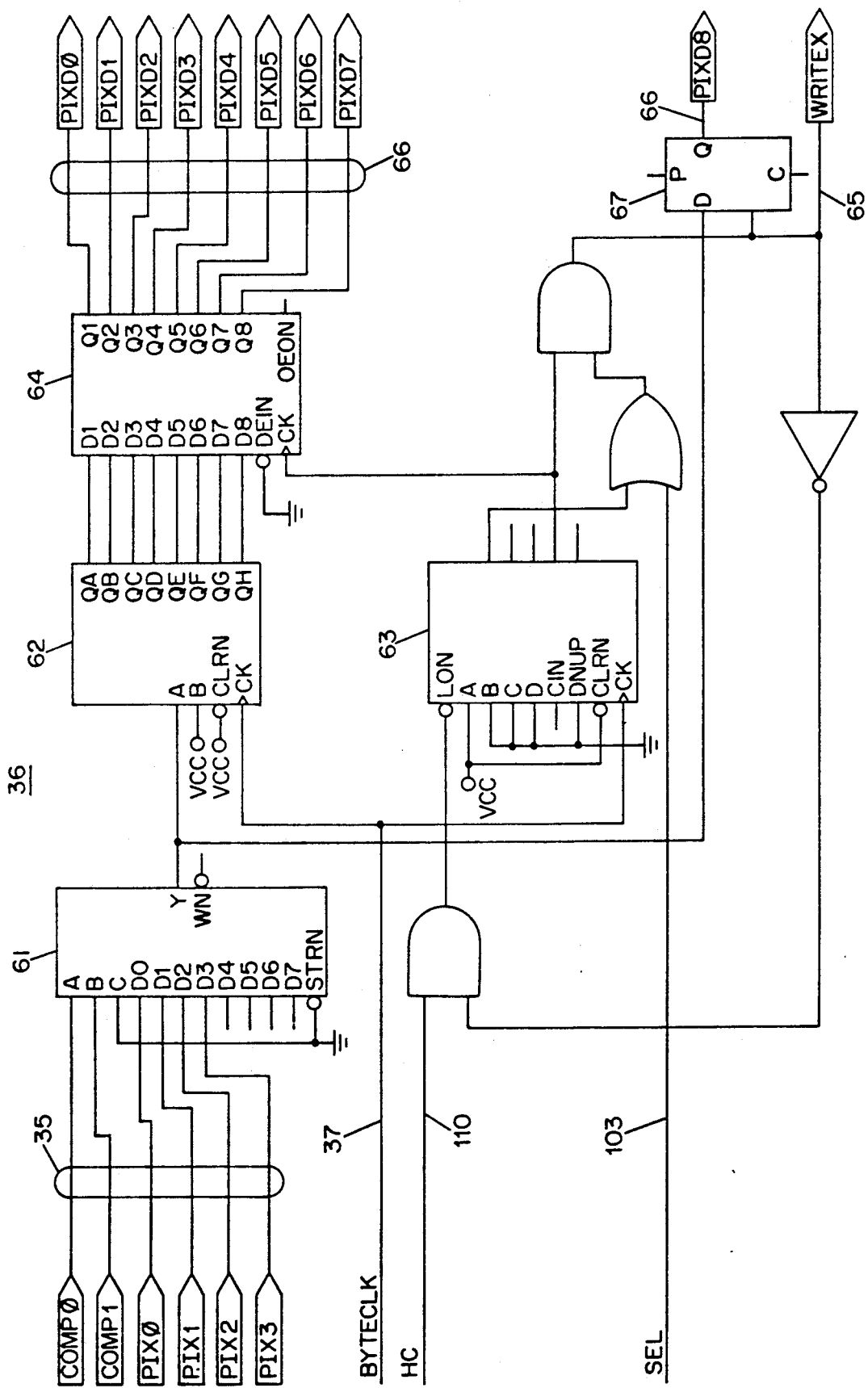
FIG. 8 shows the video processor 36 of FIG. 1 in greater detail, including an input signal COMP0.

Video processor 36 of FIG. 1 is shown in greater detail in FIG. 8 Gate 61 is a one-of-eight multiplexer, which selects which of the incoming pixel signals is to be used, based on inputs COMPO and COMPl. This allows the board to compensate between the difference in clock rates of the board and the incoming data signal. The board is designed to have its clocks run at a slightly lower frequency than the actual dot clocks. Normally this would result in incorrect pixel data when the error becomes greater than the phase clock period (about 17 nanoseconds). This point varies from board to board, but is approximately at about 95% toward the right side of the screen. To eliminate the error, a one-shot generates a signal which times out at this point, changing the compensation signal, selecting a different portion of the pixel to sample (i.e. a different one of the PIX0 through PIX3).

Figure 11:
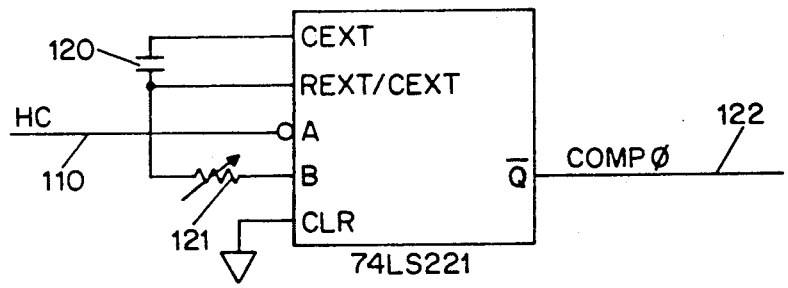
FIG. 11 shows the circuit generating the COMP0 signal that is input to FIG. 8.

In a preferred embodiment the circuit of FIG. 11 is employed to perform the compensation. Signal HC 110 starts the circuit, which then starts timing as defined by the RC network of resistor 121 and capacitor 120. Eventually the output of the circuit (which is a signal with the name COMPO 122) changes. As mentioned above, this is to occur at a time selected to be about 95% of the way across the screen. Experience shows that this timing is not at all critical, and the event of COMP0 changing can occur any time between about 50% and 95% of the way across the screen to bring about the desired recognition result. (It is this lack of criticality that permits employment of the relatively imprecise RC mechanism.)

Following signal COMP0 122 from FIG. 11 to FIG. 8, it may be seen that when COMP0 is 0, input PIX0 is selected by multiplexer 61, and when COMP0 changes, input PIXI is selected instead. (It is assumed here that COMPl is grounded at all times.)

In some embodiments of the invention, judicious selection of the frequency of the source 100 or 101 permits the one-shot to be dispensed with, in which case just one of the PIX signals is used to the exclusion of the other three.

Those skilled in the art will appreciate that the inventive concept here of compensating for cumulative sampling-time error by means of shifting the sampled phase part way across the scan line may arbitrarily be performed either by sampling at a clock slightly faster than, or slightly slower than, the underlying data rate. The embodiment here employs a SELCLK 34 signal that is just slightly less than four times the underlying data rate, and the compensation activity that occurs part way across the scan line is selection of a sample window (PIX1 instead of PIX0) that is one position earlier in time than that used for the earlier portion of the scan line. BYTECLK 37, which is a divide-by-4 version of SELCLK 34, is just slightly slower than the underlying data rate.

However, the inventive concept could just as well be practiced by using a SELCLK 34 signal that was just slightly greater than four times the underlying data rate. (In that case BYTECLK 37, which would still be a divide-by-4 version of SELCLK 34, would be just slightly faster than the underlying data rate.) The compensation to be performed part way across the scan line to correct for cumulative error in sampling times would be selection of a sample window that is one position later in time than that used for the earlier portion of the scan line.

Returning now to the data flow of FIG. 8, the pixel data selected by gate 61 is fed to eight-bit shift register 62. As each successive pixel datum comes in, it is shifted one bit to the right by signal BYTECLK 37. Gate 63 counts the pixel data bits as they come in, and latches the first eight bits into latch 64 when the eighth bit is shifted. In 640 mode the signal WRITEX 65 is generated when the QD output goes true. Signal WRITEX 65 writes the data of PIXD0 through PIXD7 66 into the video RAM 38 and increments the counters 76.

In 720 mode, the ninth bit must be latched before the WRITEX 65 signal is generated. The first eight bits are latched into gate 64 as before, but the ninth bit is delayed until both outputs QA and QD of gate 63 are high. This latches the ninth pixel in flip-flop 67, and the WRITEX 65 signal is generated with the aforementioned results.

This process continues until the next horizontal sync pulse is detected. The CPU 73 is interrupted again, the counters 76 are programmed with the starting address of the next line, and the process continues until the next Vertical Sync is detected. The CPU 73 then disables interrupts, resets the counters 76 to zero, and lets the external PC 41 know that the screenful of data is available.

The screenful of data is provided to the external PC 41 in a quick series of bus transactions, eight bits at a time if the video was 640-mode, or sixteen bits at a time if the video was 720-mode The transfer occurs under control of bus interface 72.

COMPENSATION CONSIDERATIONS

Figure 12A:
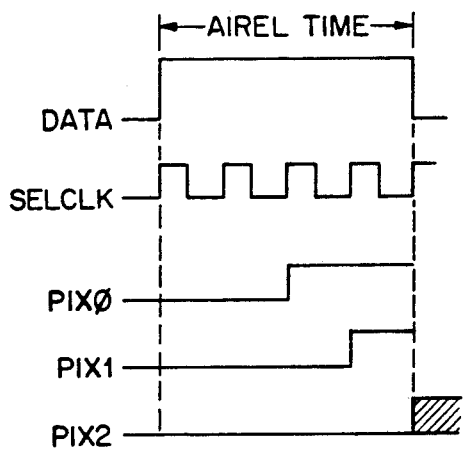
FIGS. 12a–12b show clock pulses used for circuit control.
Figure 12B:
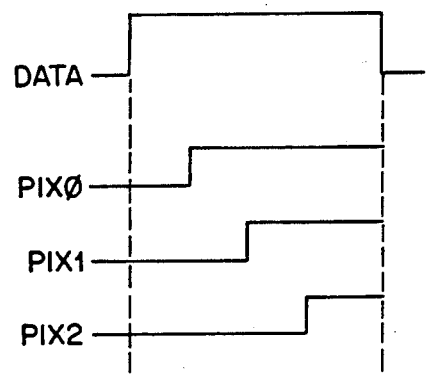

Turning now to FIG. 12, the compensation scheme according to the invention will now be discussed in further detail. Consider first the idealized case of traces (a) of FIG. 12. The data signal for one pixel (dot) time is here assumed to represent an "on" pixel that was preceded and will be followed by "off" pixels, and the pixel is assumed to be one at or near the start of a given scan line. SELCLK, which is four times the underlying data rate of the incoming data signal, gives rise to successive samples PIX0, PIX1, PIX2, and PIX3, of which the first three are shown in traces (a). In traces (a) the sample of PIX2 is erratic and unreliable because the sampling happens at a time of transition in the data. The sample of PIX0 is reliable, because it is temporally removed from the leading edge and trailing edge transitions of the data.

Traces (b) of FIG. 12 show in an idealized portrayal what has happened after the passage of time associated with perhaps half of one scan line. SELCLK was, by hypothesis, a little slower than four times the data rate, and as a consequence the cumulative error in sampling, by this time, has PIX0 coming later in the pixel time. In the apparatus according to the invention, a compensation circuit causes the PIX1 signal to be selected instead of the PIX0 signal, and for the duration of the scan line the sampling is well temporally separated from both the leading edge and trailing edge of the pixel time.

As mentioned above, traces (a) and (b) are portrayed with idealized waveforms. In real-life situations, the analog nature of the composite data signal gives rise to rising and trailing edges that are not so clean.

Of course, if the cumulative error were leading rather than lagging (due, for example, to SELCLK being slightly more than four times greater than the underlying data rate) then the appropriate compensation would be shifting, say, from PIX0 to the previous PIX3 signal rather than to the next PIX1 signal.

As mentioned above, the compensation circuitry permits extraction from a composite video data signal of reliable pixel data for many applications in addition to the character recognition application described herein. Pixel data extracted as described above are suitable for provision to a variety of display devices including liquid crystal displays and dot matrix printers.

SYSTEM THROUGHPUT

The system has been operated to capture frames at a rate of approximately 30 frames per second. The limiting factor is the speed of transfer on the PC bus 40. This could be increased by using a bus-master DMA approach, in which the system would signal to the external PC 41 that it would drive the PC bus address, data, and control signals. This adds a fair amount of complexity, but could be used for applications that warrant the extra expense. Another means to increase speed would replace the the external PC 41 with an EISA bus system, or any other system with greater bandwidth. If necessary, the very high bandwidth burst mode could be used. The system of FIG. 1 is easily capable of capturing and transferring at rates greater than 60 frames per second.

Another way to accomplish the character recognition is to implement the algorithm converting pixel data into ASCII values in hardware and software on the system board of FIG. 1, providing simple ASCII values to the external PC 41. This reduces loading on the PC bus 40 by an order of magnitude.

It will also be appreciated by those skilled in the art that the method of the invention is equally suited to generate values according to coding systems other than ASCII. For example, the code standard employed could instead be EBCDIC or Baudot. The analog video signal need not be composite, but could instead be any of a number of video signals, such as a signal including discretely provided sync and brightness values.

We claim:

1. A video character recognizer comprising:

Analog signal processor means for receiving an analog video signal and for generating a position signal and a pixel signal therefrom in response to the analog video signal;

Framing means responsive to the position signal for receiving the pixel signal and for generating an item of pixel-frame data in response to the position signal, each item of pixel-frame data being indicative of a plurality of pixel signal values; and Code conversion means responsive to an item of pixel-frame data for deriving a character code representation in response to said item of pixel-frame data, the code conversion means comprising evaluation means for assigning numerical values to the contents of the rectangular array, for calculating a result value based on the numerical values capable of being represented by a smaller number of bits than the number of positions in the array, and for using the result value as a pointer into a table, at least some of the entries in the table being code values indicative of a character in the rectangular array, and for providing the entry pointed to in the table as the character code representation.

2. The video character recognizer of claim 1 wherein the analog video signal is a composite video signal and the position signal comprises vertical sync and horizontal sync signals.

3. The video character recognizer of claim 2 wherein the analog signal processor means comprises a first comparator which generates the vertical sync signal and a second comparator which generates the horizontal sync signal.

4. The video character recognizer of claim 1 wherein the framing means comprises memory and a programmable counter generating addresses addressing said memory, said programmable counter being responsive to the position signal for generating successive addresses wherein data representative of pixel signals is stored.

5. The video character recognizer of claim 4 wherein the programmable counter generates the successive addresses at a rate greater than the rate of data of the pixel signal.

6. The video character recognizer of claim 5 wherein the position signal comprises a horizontal sync signal, and wherein is further provided delay means responsive to the horizontal sync signal for delaying the start of the generation of successive addresses until after a predetermined interval following the detection of the horizontal sync signal.

7. The video character recognizer of claim 1 wherein the item of pixel-frame data represents a rectangular array of pixels, and the height and width of the array is selected to correspond to the height and width of a displayed character.

8. The video character recognizer of claim 1 wherein the character code representation is an ASCII value.

9. The video character recognizer of claim 1 wherein the character code representation is an EBCDIC value.

10. The video character recognizer of claim 1 wherein the character code representation is a Baudot value.

11. The video character recognizer of claim 1 wherein an additional byte of data containing display attribute information is generated for each character code.

12. The video character recognizer of claim 1 wherein the code conversion means is a digital signal processor.

13. The video character recognizer of claim 1 wherein the code conversion means is a microprocessor.

14. For use in a system receiving signals from a transmitter of the type that converts character codes into corresponding character font representations and transmits the corresponding character font representations in the form of a raster-scanned analog video signal, a method of recognizing video characters conveyed by the analog video signal comprising the steps of:
receiving the analog video signal and generating a position signal and a pixel signal therefrom in response to the analog vide signal;
receiving the pixel signal and generating an item of pixel-frame data in response to the position signal, each item of pixel-frame data being indicative of a plurality of pixel signal values; and
deriving a character code representation in response to said item of pixel-frame data;
whereby the derived character code representation corresponds to a character code converted by the transmitter.

15. Framing means for receiving a pixel signal data stream and for storing digital values indicative of the contents thereof, comprising:
memory;
a programmable counter generating addresses addressing said memory, said programmable counter being responsive to the position signal for generating successive addresses wherein data representative of pixel signals is stored; and
clock means for generating a clock signal at a rate greater than the rate of data of the pixel signal data stream, the programmable counter generating the successive addresses in response to the clock means.

16. Framing means of claim 15 wherein the framing means further comprises delay means responsive to a horizontal sync signal for delaying the start of the generation of successive addresses until after a predetermined interval following the detection of the horizontal sync signal.

17. Framing means of claim 15 wherein the clock signal is generated at a rate slightly less than four times the rate of data of the pixel signal data stream.

18. A video character recognizer for receiving signals from a transmitter of the type that converts character codes into corresponding character font representations and transmits the corresponding character font representations in the form of a raster-scanned analog video signal comprising:
analog signal processor means for receiving the raster-scanned analog video signal and for generating a position signal and a pixel signal therefrom in response to the analog video signal;
framing means responsive to the position signal for receiving the pixel signal and for generating an item of pixel-frame data in response to the position signal, each item of pixel-frame data being indicative of a plurality of pixel signal values, said framing means storing pixel-frame data for substantially all of a screen are associated with the analog video signal; and
code conversion means responsive to a first one of the items of pixel-frame data for deriving a character code representation in response to said items of pixel-frame data;
whereby the derived character code representation corresponds to a character code converted by the transmitter.

19. The video character recognizer of claim 44 wherein the analog signal processor means comprises a first comparator which generates the vertical sync signal and a second comparator which generates the horizontal sync signal.

20. The video character recognizer of claim 19 wherein the framing means comprises memory and a programmable counter generating addresses addressing said memory, said programmable counter being responsive to the position signal for generating successive addresses wherein data representative of pixel signals is stored.

21. The video character recognizer of claim 20 wherein the programmable counter generates the successive addresses at a rate greater than the rate of data of the pixel signal.

22. The video character recognizer of claim 21 wherein the position signal comprises a horizontal sync signal, and wherein is further provided delay means responsive to the horizontal sync signal for delaying the start of the generation of successive addresses until after a predetermined interval following the detection of the horizontal sync signal.

23. The video character recognizer of claim 18 wherein the character code representation is an ASCII value.

24. The video character recognizer of claim 18 wherein the character code representation is an EBCDIC value.

25. The video character recognizer of claim 18 wherein the character code representation is a Baudot value.

26. The video character recognizer of claim 18 wherein an additional byte of data containing display attribute information is generated for each character code.

27. The video character recognizer of claim 18 wherein the code conversion means is a digital signal processor.

28. The video character recognizer of claim 18 wherein the code conversion means is a microprocessor.

29. Digital data collection apparatus for receiving a composite video signal carrying information for successive scan lines, and for generating digital data groups each indicative of the pixel data of a one of the successive scan lines, comprising:
   comparator means receiving said composite video signal, comparing said composite video signal with a first predetermined threshold to generate a data signal, and comparing said composite video signal with a second predetermined threshold to generate a horizontal sync signal;
   sampling means responsive to the horizontal sync signal for repetitively sampling the data signal at times determined by a first function of a clock signal, said sampling yielding an output signal; and
   compensation means responsive to the horizontal sync signal for generating a compensation signal at a time subsequent to the horizontal sync signal and having a predetermined temporal relationship with the horizontal sync signal, said sampling means being responsive to the compensation signal so as to sample the data signal at times determined by a second function of the clock signal;
   whereby the output signal values between successive horizontal sync signals comprises a digital data group indicative of the pixel data of a one of the successive scan lines.

30. Digital data collection apparatus according to claim 29 wherein the clock signal is selected to be slightly less than an integral multiple n of the data rate of the composite data signal.

31. Digital data collection apparatus according to claim 29 wherein the clock signal is selected to be slightly greater than an integral multiple n of the data rate of the composite data signal.

32. Digital data collection apparatus according to claim 30 wherein n is selected to be four.

33. Digital data collection apparatus according to claim 31 wherein n is selected to be four.

34. Digital data collection apparatus according to claim 30 wherein the sampling of the data signal at times determined by the first function of the clock signal comprises sampling once every n clock pulses in a predetermined phase relationship with the horizontal sync signal, and wherein the second function of the clock signal comprises sampling once every n clock pulses in a phase one clock pulse ahead of the predetermined phase relationship.

35. Digital data collection apparatus according to claim 31 wherein the sampling of the data signal at times determined by the first function of the clock signal comprises sampling once every n clock pulses in a predetermined phase relationship with the horizontal sync signal, and wherein the second function of the clock signal comprises sampling once every n clock pulses in a phase one clock pulse behind the predetermined phase relationship.

36. Digital data collection apparatus according to claim 32 wherein the sampling of the data signal at times determined by the first function of the clock signal comprises sampling once every four clock pulses in a phase differing by two clock pulses from the horizontal sync signal, and wherein the second function of the clock signal comprises sampling once every four clock pulses in a phase one clock pulse ahead of the phase relationship of the first function of the clock signal.

37. Digital data collection apparatus according to claim 33 wherein the sampling of the data signal at times determined by the first function of the clock signal comprises sampling once every four clock pulses in a phase differing by two clock pulses from the horizontal sync signal, and wherein the second function of the clock signal comprises sampling once every four clock pulses in a phase one clock pulse behind the phase relationship of the first function of the clock signal.

38. Digital data collection apparatus according to claim 29 wherein the compensation means comprises a one-shot and the compensation signal is an output of the one-shot, and wherein the predetermined temporal relationship with the horizontal sync signal comprises a fixed delay interval following the horizontal sync signal.

39. Digital data collection apparatus according to claim 29 further comprising gating means for gating successive digital data groups to corresponding rows of a display device having rows and columns of picture elements.

40. Digital data collection apparatus according to claim 29 wherein the display device is selected from the group consisting of a liquid crystal display screen, a plasma discharge display screen, and a fluorescent display screen.

41. Digital data collection apparatus according to claim 29 further comprising gating means for gating successive digital data groups to corresponding rows of a printing device.

42. Digital data collection apparatus according to claim 29 wherein the printing device is selected from the group consisting of a dot matrix printer, a laser printer, and a thermal printer.

43. A video character recognizer comprising:
   analog signal processor means for receiving an analog video signal and for generating a position signal and a pixel signal therefrom in response to the analog video signal;
   framing means responsive to the position signal for receiving the pixel signal and for generating an item of pixel-frame data in response to the position signal, each item of pixel-frame data being indicative of a plurality of pixel signal values, said framing means storing pixel-frame data for substantially all of a screen area associated with the analog vide signal; and code conversion means responsive to a first one of said items of pixel-frame data for deriving a character code representation in response to said item of pixel-frame data, said code conversing means comprising evaluation means for assigning numerical values to the contents of a rectangular array of pixels corresponding to the contents of the item of pixel-frame data, for calculating a result value based on the numerical values capable of being represented by a smaller number of bits than the number of positions in the array, and for using the result value as a pointer into a table containing entries, at least some of the entries in the table being code values indicative of a character in the rectangular array, and for providing the entry pointed to in the table as the character code representation.

44. A video character recognizer comprising:

analog signal processor means for receiving a composite video signal and for generating a position signal having a vertical sync and a horizontal sync, and a pixel signal therefrom in response to the composite vide signal;

framing means responsive to the position signal for receiving the pixel signal and for generating an item of pixel-frame data in response to the position signal, each item of pixel-frame data being indicative of a plurality of pixel signal values, said framing mean storing pixel-frame data for substantially all of a screen are associated with the analog video signal; and code conversion means response to items of pixel-frame data for deriving a character code representation in response to said item of pixel-frame data.

45. A video character recognizer comprising:

analog signal processor means for receiving an analog video signal and of generating a position signal and a pixel signal therefrom in response to the analog video signal;

framing means responsive to the position signal for receiving the pixel signal and for generating an item of pixel-frame data in response to the position signal, each item of pixel-frame data being indicative of a plurality of pixel signal values, said framing means storing pixel-frame data for substantially all of a screen area associated with the analog video signal; and code conversion means response to a first one of the items of pixel-frame data for deriving a character code representation including an additional byte of data containing display attribute information in response to said item of pixel-frame data.

* * * * *